US006262154B1

(12) United States Patent
Okamura et al.

(10) Patent No.: US 6,262,154 B1
(45) Date of Patent: Jul. 17, 2001

(54) TREATMENT FOR RUBBER-REINFORCING FIBERS, REINFORCING FIBERS, AND REINFORCED RUBBERS

(75) Inventors: Akinobu Okamura; Takuo Hamaguchi; Mitsuharu Akiyama, all of Tsu; Osamu Mori; Mitsugu Ishihara, both of Kawasaki, all of (JP)

(73) Assignees: Nippon Sheet Glass Co., Ltd., Osaka; Nippon Zeon Co., Ltd., Tokyo, both of (JP)

( * ) Notice: Subject to any disclaimer, the term of this patent is extended or adjusted under 35 U.S.C. 154(b) by 0 days.

(21) Appl. No.: 09/214,379
(22) PCT Filed: Jul. 7, 1997
(86) PCT No.: PCT/JP97/02350
  § 371 Date: Jun. 10, 1999
  § 102(e) Date: Jun. 10, 1999
(87) PCT Pub. No.: WO98/01614
  PCT Pub. Date: Jan. 15, 1998

(30) Foreign Application Priority Data

Jul. 9, 1996 (JP) .................................................. 8-178985

(51) Int. Cl.$^7$ ...................................................... C08K 3/00
(52) U.S. Cl. ........................................... 524/100; 524/494
(58) Field of Search ...................................... 524/100, 494

(56) References Cited

FOREIGN PATENT DOCUMENTS

| 0381457 | 8/1990 | (EP) . |
|---------|--------|--------|
| 0441214 | 8/1991 | (EP) . |
| 0624557 | 11/1994 | (EP) . |
| 1-221433 | 9/1989 | (JP) . |
| 4-361668 | 12/1992 | (JP) . |
| 5-148771 | 6/1993 | (JP) . |
| 5-71710 | 10/1993 | (JP) . |
| 6-341061 | 12/1994 | (JP) . |
| 6-341073 | 12/1994 | (JP) . |

OTHER PUBLICATIONS

Patent Abstracts of Japan vol. 017, No. 540 (C–1115), Sep. 29, 1993 & JP 05 148770 A (Toray Ind Inc), Jun. 15, 1993.

*Primary Examiner*—Edward J. Cain
(74) *Attorney, Agent, or Firm*—Wenderoth, Lind & Ponack, L.L.P.

(57) ABSTRACT

A reinforcing fiber for a rubber product that has excellent heat resistance, water resistance and resistance to flex fatigue without undergoing a complicated production process and a treatment agent therefore. This treatment agent comprises a rubber latex, a resorcin-formaldehyde water-soluble condensate and triazine thiol.

25 Claims, No Drawings

TREATMENT FOR RUBBER-REINFORCING FIBERS, REINFORCING FIBERS, AND REINFORCED RUBBERS

CROSS-REFERENCE

This application is a 371 application of PCT/JP97/02350 filed Jul. 7, 1997.

TECHNICAL FIELD

The present invention relates to a rubber-reinforcing fiber treatment agent, a reinforcing fiber and a rubber-reinforced product. More specifically, it relates to a treatment agent for a rubber-reinforcing fiber that is used to reinforce rubber products such as a rubber belt, tire and the like and is excellent in adhesion, heat resistance, flexing resistance and water resistance; a rubber-reinforcing fiber coated with the treatment agent; and a rubber-reinforced product reinforced with the reinforcing fiber.

BACKGROUND ART

As a reinforcement for a rubber product such as a rubber belt, tire and the like, reinforcing fibers such as glass fibers, polyester fibers, polyamide fibers and the like are widely used.

Since a rubber product such as a rubber belt and the like undergoes flex stress repeatedly, its performance degrades due to its flex fatigue, whereby a reinforcing fiber may be separated from a rubber matrix or worn out, with the result that its strength lowers easily. Such a phenomenon tends to be accelerated by heat and moisture, in particular. To prevent such flex fatigue by separation and obtain a sufficient reinforcing effect, drape and adhesion between a reinforcing fiber and rubber must be increased, and heat resistance and water resistance must be provided to the reinforcing fiber. To this end, various treatment agents are coated on the surface of a reinforcing fiber.

JP-A 1-221433 proposes various treatment agents such as a treatment agent comprising a resorcin-formaldehyde water-soluble condensate, vinylpyridine-butadiene-styrene terpolymer latex, dicarboxylated butadiene-styrene copolymer latex and chlorosulfonated polyethylene latex in combination.

Although the use of these treatment agents can improve adhesion between a reinforcing fiber and a rubber matrix and the heat resistance and flexing resistance of a treatment agent itself to a certain degree, it cannot yet be said that they are satisfactory. Therefore, rubber products having excellent heat resistance, water resistance and resistance to flex fatigue are difficult to obtain when reinforcing fibers treated with these treatment agents are used.

To increase adhesion between the reinforcing fiber and a rubber matrix, JP-B 5-71710 also proposes a rubber-reinforcing fiber formed by laminating the second layer containing a halogen-containing polymer and isocyanate on the first layer formed on a reinforcing fiber and containing a resorcin-formaldehyde water-soluble condensate and a latex and further laminating the third layer containing the same rubber as matrix rubber on the second layer. The production process of the rubber-reinforcing fiber of this type, however, is complicated and uneconomical since the second and third layer-forming steps are required, subsequently to the first layer-forming step.

DISCLOSURE OF INVENTION

It is the first object of the present invention to provide a fiber treatment agent for a reinforcing fiber, which solves the above problems of the prior art and can give reinforced rubber products having excellent heat resistance, water resistance and resistance to flex fatigue without undergoing a complicated production process.

It is the second object of the present invention to provide the above reinforcing fiber treated with the fiber treatment agent of the present invention.

It is the third object of the present invention to provide a reinforced product reinforced with the reinforcing fiber of the present invention.

Other objects and advantages of the present invention will become apparent from the following description.

According to the present invention, firstly, the above objects and advantages of the present invention can be attained by a rubber-reinforcing fiber treatment agent comprising a rubber latex, a resorcin-formaldehyde water-soluble condensate and triazine thiol.

According to the present invention, secondly, there is provided a reinforcing fiber treated with the above fiber treatment agent of the present invention and, thirdly, there is provided a rubber-reinforced product reinforced with the rubber-reinforcing fiber of the present invention.

The present invention will be described in detail hereinafter.

(Rubber-reinforcing Fiber Treatment Agent)

As the rubber latex which is one of the components of the rubber-reinforcing fiber treatment agent of the present invention may be preferably used a butadiene-styrene copolymer latex, dicarboxylated butadiene-styrene copolymer latex, vinylpyridine-butadiene-styrene terpolymer latex, chloroprene latex, butadiene rubber latex, chlorosulfonated polyethylene latex, acrylonitrile-butadiene copolymer latex, nitrile group-containing highly saturated copolymer rubber latex and the like. These latices may be used alone or in admixture of two or more. A favorable result can be obtained in many cases by using a latex of rubber, which is the same as or similar to rubber to be reinforced in type, as the rubber latex to be contained in the rubber-reinforcing fiber treatment agent. A particularly favorable result can be obtained by applying a fiber treatment agent containing nitrile group-containing highly saturated copolymer rubber latex to a fiber for reinforcing a rubber blend that contains nitrile group-containing highly saturated copolymer rubber.

As the butadiene-styrene copolymer rubber latex, it is particularly suitable to use, for example, a copolymer prepared by copolymerizing butadiene and styrene in a weight ratio of 60:40 to 90:10. Preferred examples of this latex include JSR 2108 (trade name, manufactured by Japan Synthetic Rubber Co., Ltd.), Baystal S60 (trade name, manufactured by Bayer AG), J9040 (trade name, manufactured by Sumika ABS Latex Co., Ltd.), Nipol LX110 (trade name, manufactured by Nippon Zeon Co., Ltd.) and the like.

As the dicarboxylated butadiene-styrene copolymer latex, a copolymer comprising 20 to 80 wt % of butadiene, 5 to 70 wt % of styrene and 1 to 10 wt % of an ethylenic unsaturated dicarboxylic acid is particularly suitable, for example. Preferred examples of this latex include Nipol 2570X5 (trade name, manufactured by Nippon Zeon Co., Ltd.), JSR 0668 (trade name, manufactured by Japan Synthetic Rubber Co., Ltd.) and the like.

As the vinylpyridine-butadiene-styrene terpolymer latex may be used, for example, many terpolymers of this type known to those skilled in the art. For example, a terpolymer comprising vinylpyridine, butadiene and styrene in a weight ratio of 10:80:10 to 20:60:20 is particularly suitable. Preferred examples of this terpolymer include Nipol 2518FS (trade name, manufactured by Nippon Zeon Co., Ltd.), JSR 0650 (trade name, manufactured by Japan Synthetic Rubber Co., Ltd.), Pyratex (trade name, manufactured by Sumika ABS Latex Co., Ltd.) and the like.

As the chlorosulfonated polyethylene latex, a polymer having a chlorine content of 25 to 43 wt % and a sulfur content of 1.0 to 1.5 wt % is particularly suitable. Preferred examples of this terpolymer include CSM-450 (trade name, manufactured by Sumitomo Seika Chemicals Co., Ltd.) and the like.

As the acrylonitrile-butadiene copolymer latex, a copolymer containing 30 to 43% of bound acrylonitrile is particularly suitable. Preferred examples of this latex include Nipol 1561 (trade name, manufactured by Nippon Zeon Co., Ltd.) and the like.

The nitrile group-containing highly saturated polymer rubber latex preferably has an iodine valence of 120 or less from the viewpoint of the strength of a rubber film and the adhesion strength to matrix rubber. The valence of iodine is preferably 0 to 100. The content (amount of bound acrylonitrile) of unsaturated nitrile units in the nitrile group-containing highly saturated polymer rubber is preferably 10 to 60 wt % from the viewpoint of adhesion and drape for the matrix rubber. Illustrative examples of the nitrile group-containing highly saturated polymer rubber include hydrogenated products of butadiene-acrylonitrile copolymer rubber, isoprene-butadiene-acrylonitrile copolymer rubber and isoprene-acrylonitrile copolymer rubber; butadiene-methyl acrylate-acrylonitrile copolymer rubber, butadiene-acrylic acid-acrylonitrile copolymer rubber and hydrogenated products thereof; butadiene-ethylene-acrylonitrile copolymer rubber, butyl acrylate-ethoxyethyl acrylate-vinyl chloroacetate-acrylonitrile copolymer rubber, butyl acrylate-ethoxyethyl acrylate-vinylnorbornene-acrylonitrile copolymer rubber and the like. As the latex may be preferably used "Zetpol Latex" (trade name, manufactured by Nippon Zeon Co., Ltd.). The valence of iodine is determined in accordance with JIS K 0070.

The resorcin-formaldehyde water-soluble condensate (to be abbreviated as RF hereinafter) which is the second component of the rubber-reinforcing fiber treatment agent of the present invention is preferably, for example, a resol-type water-soluble addition condensate obtained by reacting resorcin with formaldehyde in the presence of an alkaline catalyst such as alkali hydroxide or amine, particularly preferably a reaction product obtained by reacting resorcin with formaldehyde in a molar ratio of 1:0.5 to 3.

Illustrative examples of the triazine thiol, which is the most characteristic component of the rubber-reinforcing fiber treatment agent of the present invention, include 1,3,5-triazine-2,4,6-trithiol, 6-amino-1,3,5-triazine-2,4-dithiol, 6-dibutylamino-1,3,5-triazine-2,4-dithiol and the like. Of these, 1,3,5-triazine-2,4,6-trithiol is preferred. It is preferred that triazine thiol is ground to a particle size of 0.1 to 1.0 $\mu$m by a ball mill or the like, and dispersed into a dispersant such as water to a concentration of, for example, 10 to 50 wt % before use. The dispersant used is not particularly limited, and other dispersants such as alcohols may be used, in addition to water.

As an oxidizing agent may be used an organic peroxide, chloranil, benzoquinone, resorcinol and the like. Of these, chloranil is particularly preferred.

In the present invention, the proportions of the rubber latex, RF, triazine thiol and oxidizing agent are preferably 50 to 95 wt % (more preferably 65 to 85 wt %), 2 to 25 wt % (more preferably 5 to 20 wt %), 0.5 to 20 wt % (more preferably 2 to 10 wt %) and 0 to 10 wt % (more preferably 0 to 5 wt %) in terms of the ratio of solid contents, respectively. Water is added to these as required, and the resulting mixture is uniformly mixed to prepare an aqueous treatment solution. When the solid content ratio of the triazine thiol contained in the thus obtained rubber-reinforcing fiber treatment agent of the present invention is outside the above range, the improvements of heat resistance, water resistance and resistance to flex fatigue are not observed and the effect of the present invention is not obtained sufficiently. Although the effect of the present invention is still obtained even if the oxidizing agent is not added, heat resistance, water resistance and resistance to flex fatigue are further improved when it is added. In this case, when the proportion of the oxidizing agent exceeds the above range, the effect remains unchanged. When the proportion of the RF is too large, the coating film of the treatment agent of the present invention becomes hard, whereby a reinforcing fiber becomes hard and sufficient resistance to flex fatigue is hardly obtained. When the proportion of the RF is too small, sufficient adhesion to a rubber matrix is hardly obtained.

The solid content of the aqueous treatment agent of the present invention is 10 to 40 wt %, preferably 20 to 30 wt %. When the solid content is too small, build-up on a reinforcing fiber becomes insufficient, while when the solid content is too large, it is difficult to control the amount of build-up on the reinforcing fiber, thereby making it difficult to obtain a rubber-reinforcing fiber having the uniform amount of build-up.

Although the treatment agent of the present invention comprises the above rubber latex, RF and triazine thiol as essential ingredients, it may also contain a base such as ammonia to control its pH and further contain sulfur, stabilizer, antioxidant and the like as required, in addition to the above oxidizing agent.

(Rubber-reinforcing Fiber)

A fiber for the rubber-reinforcing fiber usable in the present invention is not particularly limited. Specific examples of the fiber include glass fiber; polyvinyl alcohol fibers typified by vinylon fiber; polyester fibers; polyamide fibers such as nylon and aramid (aromatic polyamide); carbon fibers; polyparaphenylene benzoxazole fibers; and the like. Of these, glass fiber and aramid fiber are particularly preferred. These fibers may be in various forms, and specific examples of such forms include staple, filament, cord, rope, canvas or the like. The glass composition of the glass fiber is not limited, as exemplified by E-glass, high-strength glass and the like. The filament diameter of the glass fiber is also not particularly limited but is generally 5 to 13 $\mu$m. The aramid fiber of 500 to 5,000 denier is generally used.

(Treatment of rubber-reinforcing Fiber)

The method for treating the above fiber is not particularly limited in the present invention. Before the fiber is treated with the treatment agent of the present invention, it can be suitably treated with an epoxy, polyisocyanate or silane coupling agent according to the type of the fiber. One example of the method is as follows.

A glass fiber strand as the fiber is immersed in the treatment agent of the present invention and pulled up to remove a surplus of the treatment agent, and the strand is heated at 200 to 300° C. for 0.5 to 3 minutes as required to build up the treatment agent on the surface of the glass fiber strand. On this occasion, the glass fiber strand may or may not be treated with greige goods at the time of spinning. A desired number of the glass fiber strands are bundled and twisted in an ordinary way to obtain a rubber-reinforcing fiber (cord). This rubber-reinforcing fiber is buried into an unvulcanized rubber matrix by a known method per se, and the unvulcanized rubber matrix is vulcanized by heating at 120 to 180° C. under pressure for 1 to 120 minutes.

In the above method, the treatment agent of the present invention is coated on the fiber generally in an amount of 10 to 30 wt % as a solid content, based on the weight of the fiber treated with the fiber treatment agent. The type of rubber to be reinforced with a rubber-reinforcing fiber treated with the treatment agent of the present invention is not particularly limited, and there may be used various types of rubber such as chloroprene rubber, chlorosulfonated polyethylene rubber, nitrile group-containing highly saturated copolymer rubber and the like. Particularly when nitrile group-containing highly saturated copolymer rubber is used, an extremely favorable result can be obtained. When a rubber-reinforcing fiber cord coated with the treatment agent of the present invention is buried into the rubber which is to be vulcanized, additives to be generally added to rubber, such as a vulcanizer, vulcanizing accelerator, pigment, fats and oils, and stabilizer may be added according to purpose. The content of the rubber-reinforcing fiber cord in a rubber product obtained after vulcanization and molding, though determined depending on the type of the rubber product, is generally 10 to 70 wt %, preferably 20 to 40 wt %.

A rubber product obtained by the present invention is excellent in heat resistance, water resistance and resistance to flex fatigue. Therefore, a rubber-reinforcing fiber treated with the fiber treatment agent of the present invention can be advantageously used as a reinforcing fiber for a rubber-reinforced product such as an auto timing belt which undergoes flex stress in an environment influenced by heat and moisture.

The following examples are given to further illustrate the present invention. In the following examples, "parts" and "%" are based on weight unless otherwise stated.

EXAMPLES (Preparation of Rubber Blend)

A rubber blend was prepared according to the formulation shown in Table 1. In the table, "Zetpol 2020" is nitrile group-containing highly saturated copolymer rubber (trade name, manufactured by Nippon Zeon Co., Ltd.) having an iodine valence of 28 and comprising 36% of bound acrylonitrile.

TABLE 1

| formulation | parts |
| --- | --- |
| Zetpol 2020 | 100.0 |
| zinc white No. 1 | 5.0 |
| stearic acid | 1.0 |
| trioctyl trimellitate | 10.0 |
| SRF carbon | 60.0 |
| 4,4-(α,α-dimethylbenzyl) diphenylamine | 1.5 |
| mercaptobenzothiazole zinc salt | 1.5 |
| tetramethylthiuram disulfide | 1.5 |
| sulfur | 0.5 |
| cyclohexylbenzothiazyl sulfenamide | 1.0 |

(Preparation of RF Solution)

An RF solution was prepared in accordance with the formulation shown in Table 2.

TABLE 2

| | |
| --- | --- |
| resorcin | 7.8 parts |
| formalin (37%) | 6.9 parts |
| aqueous solution of sodium hydroxide (10%) | 2.0 parts |
| water | 115.2 parts |

(Preparation of Treatment Agent)

Seven treatment agents A to G were prepared using the RF solution shown in Table 2 in accordance with the formulation shown in Table 3 (the unit of figures below each treatment agent is "parts"). In the table, "Nipol 2518FS" is a vinylpyridine-butadiene-styrene terpolymer latex (product of Nippon Zeon Co., Ltd.; a solid content of 40%), "CSM-450" is a chlorosulfonated polyethylene rubber latex (product of Sumitomo Seika Chemicals Co., Ltd.; a solid content of 40%), and "Zetpol Latex" is nitrile group-containing highly saturated copolymer rubber latex (product of Nippon Zeon Co., Ltd.; an iodine valence of 28, 36% of bound acrylonitrile and a solid content of 40%). The solid content of each treatment agent was 25 to 27 wt %.

TABLE 3

| treatment agent | A | B | C | D | E | F | G |
| --- | --- | --- | --- | --- | --- | --- | --- |
| RF solution | 35.0 | 35.0 | 35.0 | 30.0 | 35.0 | 35.0 | 30.0 |
| Nipol 2518FS | — | — | 10.0 | 45.0 | — | 10.0 | 45.0 |
| CSM-450 | — | — | — | 20.0 | — | — | 20.0 |
| Zetpol Latex | 60.0 | 60.0 | 50.0 | — | 60.0 | 50.0 | — |
| 1,3,5-triazine-2,4,6-trithiol | 3.0 | 3.0 | 2.0 | 1.5 | — | — | — |
| chloranil | 1.0 | — | 1.0 | 0.8 | — | — | — |
| 25% ammonia water | 1.0 | 1.0 | 1.0 | 1.0 | 1.0 | 1.0 | 1.0 |
| water | 4.0 | 4.0 | 4.0 | 4.0 | 4.0 | 4.0 | 4.0 |

(Production of Treated Fiber)

This treatment agent was coated on a glass fiber strand (filament diameter of 9 μm, 101 tex (600 filaments)) having non-alkali glass composition (64.4 wt % of $SiO_2$, 25.0 wt % of $Al_2O_3$, 0.3 wt % of CaO, 10.0 wt % of MgO, 0.1 wt % of $B_2O_3$ and 0.2 wt % of $Na_2O+K_2O$) to ensure that the build-up rate of a solid content is to be about 19%. After the coated glass fiber strand was heated at 280° C. for 1 minute, it was first twisted 2.1 times per inch in one direction. Thereafter, 11 of such strands were combined together and twisted 2.1 times per 1 inch in the opposite direction to give a glass fiber cord.

Similarly, the above treatment agent was coated on an aramid fiber strand (Technora T202 of Teijin Ltd., 1,500 d) to ensure that the build-up rate of a solid content is to be about 12%. After the coated aramid strand was heated at 250° C. for 1 minute, two of such strands were combined together and twisted 3.1 times per 1 inch to give an aramid fiber cord.

(Evaluation method)

The thus obtained treated cords were arranged to a length of 12 cm and a width of 25 mm on a sheet of the above rubber blend and vulcanized at a temperature of 150° C. and a pressure of 5 MPa for 30 minutes to give an adhesion strength test piece. A peel test was conducted on the obtained test piece to measure initial adhesion. The content of the above treated cord in the test piece was 30 wt %.

A test piece obtained similarly was heated in an air oven at 120° C. for 168 hours, and a peel test was conducted on the test piece to measure its heat-resistant adhesion. A test piece obtained similarly was boiled in water for 1 hour to measure its adhesion (water resistant adhesion). The results are classified by the rubber latex components of the fiber treatment agents and shown in Tables 4 to 7.

Further, a toothed belt having a width of 19 mm and a length of 980 mm was prepared using a treated fiber cord obtained similarly and the nitrile group-containing highly saturated copolymer rubber blend shown in Table 1. This toothed belt was set in a traveling tester equipped with a 6,000-rpm drive motor, and a heat-resistant traveling test was conducted at 120° C. for 600 hours. Another toothed belt obtained similarly was set in a water-injection traveling tester equipped with a 6,000-rpm drive motor, and a water-injection traveling test was also conducted at room temperature for 24 hours. The tensile strength of the belt after the heat-resistant traveling test and that after the water-injection traveling test were measured, respectively, and the ratio of each tensile strength to the tensile strength before the corresponding traveling test, that is, tensile strength retention (%) was obtained. The results are shown in Tables 4 to 7 as tensile strength retentions after heat-resistant traveling and water-injection traveling.

TABLE 4

|  | Example | | Comparative |
| --- | --- | --- | --- |
|  | 1 | 2 | Example 1 |
| type of cord | glass fiber cord | | glass fiber cord |
| treatment agent No. | A | B | E |
| adhesion (kg/25 mm) | | | |
| initial | 28.6 | 26.9 | 21.5 |
| heat resistant | 25.5 | 23.3 | 17.8 |
| water resistant | 28.3 | 27.4 | 20.5 |
| tensile strength retention after traveling test (%) | | | |
| heat-resistant traveling | 86.4 | 80.5 | 72.5 |
| water-injection traveling | 76.0 | 74.7 | 65.8 |

TABLE 5

|  | Example 3 | Comparative Example 2 |
| --- | --- | --- |
| type of cord | glass fiber cord | glass fiber cord |
| treatment agent No. | C | F |
| adhesion (kg/25 mm) | | |
| initial | 27.4 | 16.7 |
| heat resistant | 21.5 | 12.5 |
| water resistant | 26.6 | 14.8 |
| tensile strength retention after traveling test (%) | | |
| heat-resistant traveling | 76.7 | 63.6 |
| water-injection traveling | 68.4 | 54.5 |

TABLE 6

|  | Example 4 | Comparative Example 3 |
| --- | --- | --- |
| type of cord | glass fiber cord | glass fiber cord |
| treatment agent No. | D | G |
| adhesion (kg/25 mm) | | |
| initial | 26.5 | 19.5 |
| heat resistant | 20.7 | 15.6 |
| water resistant | 20.2 | 13.7 |
| tensile strength retention | | |

TABLE 6-continued

|  | Example 4 | Comparative Example 3 |
| --- | --- | --- |
| after traveling test (%) | | |
| heat-resistant traveling | 73.3 | 58.7 |
| water-injection traveling | 66.5 | 41.3 |

TABLE 7

|  | Example 5 | Comparative Example 4 |
| --- | --- | --- |
| type of cord | aramid fiber cord | aramid fiber cord |
| treatment agent No. | A | E |
| adhesion (kg/25 mm) | | |
| initial | 15.0 | 8.5 |
| heat resistant | 13.5 | 4.5 |
| water resistant | 10.5 | 6.0 |
| tensile strength retention after traveling test (%) | | |
| heat-resistant traveling | 82.7 | 71.8 |
| water-injection traveling | 74.5 | 66.2 |

A rubber product reinforced with the rubber-reinforcing fiber of the present invention is inexpensive and has excellent heat resistance, water resistance and resistance to flex fatigue, as compared with a conventional treatment agent. The rubber-reinforcing fiber of the present invention can be extremely advantageously used as a reinforcing fiber for a rubber-reinforced product such as a belt exemplified by a toothed belt, V belt and the like.

What is claimed is:

1. A rubber-reinforcing fiber treatment agent comprising a nitrile group-containing highly saturated copolymer rubber latex, a resorcin-formaldehyde water-soluble condensate and triazine thiol.

2. The rubber-reinforcing fiber treatment agent of claim 1, which comprises a nitrile group-containing highly saturated copolymer rubber latex, a resorcin-formaldehyde water-soluble condensate, triazine thiol and an oxidizing agent.

3. The rubber-reinforcing fiber treatment agent of claim 1 or 2, which contains 50 to 95 wt % of the nitrile group-containing highly saturated copolymer rubber latex, 2 to 25 wt % of the resorcin-formaldehyde water-soluble condensate, 0.5 to 20 wt % of triazine thiol and 0 to 10 wt % of the oxidizing agent as solid contents, based on the total weight of all the solid contents.

4. The rubber-reinforcing fiber treatment agent of claim 1 or 2, wherein the triazine thiol is 1,3,5-triazine-2,4,6-trithiol.

5. The rubber-reinforcing fiber treatment agent of claim 2, wherein the oxidizing agent is chloranil.

6. The rubber-reinforcing fiber treatment agent of claim 3, which contains a nitrile group-containing highly saturated copolymer rubber latex, a resorcin-formaldehyde water-soluble condensate, triazine thiol and an oxidizing agent in the total solid content of 10 to 40 wt %.

7. A rubber-reinforcing fiber treated with the fiber treatment agent of claim 1 or 2.

8. The rubber-reinforcing fiber of claim 7, wherein the fiber treatment agent is coated on a fiber in an amount of 10 to 30 wt % as a solid content based on the weight of the fiber treated with the fiber treatment agent.

9. The rubber-reinforcing fiber of claim 8, wherein the fiber is a glass fiber or an aramid fiber.

10. A rubber-reinforced product reinforced with the rubber-reinforcing fiber of claim 7.

11. A rubber-reinforced product reinforced with the rubber-reinforcing fiber of claim 7, wherein a matrix of the rubber-reinforced product contains a nitrile group-containing highly saturated copolymer rubber.

12. The rubber-reinforced product of claim 10, wherein the rubber-reinforcing fiber is contained in an amount of 10 to 70 wt %, based on the rubber-reinforced product.

13. A rubber-reinforced product reinforced with the rubber-reinforcing fiber of claim 8, wherein a matrix of the rubber-reinforced product contains a nitrile group-containing highly saturated copolymer rubber.

14. A rubber-reinforced product reinforced with the rubber-reinforcing fiber of claim 9, wherein a matrix of the rubber-reinforced product contains a nitrile group-containing highly saturated copolymer rubber.

15. The rubber-reinforcing fiber treatment agent of claim 3, wherein the triazine thiol is 1,3,5-triazine-2,4,6-trithiol.

16. The rubber-reinforcing fiber treatment agent of claim 3, wherein the oxidizing agent is chloranil.

17. A rubber-reinforcing fiber treated with the fiber treatment agent of claim 3.

18. A rubber-reinforcing fiber treated with the fiber treatment agent of claim 4.

19. A rubber-reinforcing fiber treated with the fiber treatment agent of claim 5.

20. A rubber-reinforcing fiber treated with the fiber treatment agent of claim 6.

21. A rubber-reinforced product reinforced with the rubber-reinforcing fiber of claim 17.

22. A rubber-reinforced product reinforced with the rubber-reinforcing fiber of claim 18.

23. A rubber-reinforced product reinforced with the rubber-reinforcing fiber of claim 19.

24. A rubber-reinforced product reinforced with the rubber-reinforcing fiber of claim 20.

25. The rubber-reinforced product of claim 11, which a rubber-reinforcing fiber is contained in an amount of 10 to 70 wt %, based on the rubber-reinforced product.

* * * * *